US012743864B2

(12) United States Patent
Zhang et al.

(10) Patent No.: US 12,743,864 B2
(45) Date of Patent: Sep. 22, 2026

(54) ELECTRONIC APPARATUS AND IMAGE PROCESSING METHOD OF ELECTRONIC APPARATUS

(71) Applicant: HUAWEI TECHNOLOGIES CO., LTD., Shenzhen (CN)

(72) Inventors: Weicheng Zhang, Shanghai (CN); Shaojie Chen, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 307 days.

(21) Appl. No.: 18/493,917

(22) Filed: Oct. 25, 2023

(65) Prior Publication Data

US 2024/0054751 A1 Feb. 15, 2024

Related U.S. Application Data

(63) Continuation of application No. PCT/CN2021/089980, filed on Apr. 26, 2021.

(51) Int. Cl.
*G06V 10/44* (2022.01)
*G06T 3/4015* (2024.01)
(Continued)

(52) U.S. Cl.
CPC ............ *G06V 10/44* (2022.01); *G06T 3/4015* (2013.01); *G06T 7/20* (2013.01); *G06V 10/56* (2022.01); *G06V 10/60* (2022.01); *G06V 10/764* (2022.01)

(58) Field of Classification Search
CPC ........ G06V 10/44; G06V 10/56; G06V 10/60; G06V 10/764; G06T 3/4015; G06T 7/20;
(Continued)

(56) References Cited

U.S. PATENT DOCUMENTS 12,620,093 B2 * 5/2026 Wang .................... G06T 7/0012
2003/0039310 A1 * 2/2003 Wu ...................... H04N 19/139
375/E7.181

(Continued)

FOREIGN PATENT DOCUMENTS

CN 102254301 B 1/2013
CN 103179407 A 6/2013

(Continued)

OTHER PUBLICATIONS

Chen, C., Chen, Q., Xu, J., & Koltun, V. (2018). Learning to See in the Dark. ArXiv:1805.01934 [Cs]. https://arxiv.org/abs/1805.01934 (Year: 2018).*

(Continued)

*Primary Examiner* — Gregory A Morse
*Assistant Examiner* — David Alexander Wambst

(57) ABSTRACT

An electronic apparatus includes: an artificial intelligence AI processor, configured to select a first image processing model from a plurality of image processing models based on scenario information. The AI processor performs first image signal processing on a first image signal by using the first image processing model, to obtain a second image signal. The first image signal is obtained based on first image data output by an image sensor. The scenario information represents feature classification of the first image signal. An image signal processor ISP, configured to perform second image signal processing on the second image signal, obtains a first image processing result. The electronic apparatus provided in embodiments of this application can improve an image processing effect.

19 Claims, 7 Drawing Sheets

800

(51) Int. Cl.

| | |
|---|---|
| ***G06T 7/20*** | (2017.01) |
| ***G06V 10/56*** | (2022.01) |
| ***G06V 10/60*** | (2022.01) |
| ***G06V 10/764*** | (2022.01) |

(58) Field of Classification Search
CPC ............ G06T 5/60; G06T 2207/20008; G06T 2207/20084
See application file for complete search history.

(56) References Cited

U.S. PATENT DOCUMENTS

| | | | | |
|---|---|---|---|---|
| 2017/0185871 | A1 | 6/2017 | Zhang et al. | |
| 2020/0401889 | A1* | 12/2020 | Lee .......................... | G06N 3/08 |
| 2021/0097646 | A1* | 4/2021 | Choi ........................ | G06N 3/08 |

FOREIGN PATENT DOCUMENTS

| | | | |
|---|---|---|---|
| CN | 103295238 | A | 9/2013 |
| CN | 102547162 | B | 10/2014 |
| CN | 106331433 | A | 1/2017 |
| CN | 107248144 | A | 10/2017 |
| CN | 109688351 | A | 4/2019 |
| CN | 114514552 | A | 5/2022 |
| EP | 3674967 | A1 | 7/2020 |
| WO | 2022056729 | A1 | 3/2022 |

OTHER PUBLICATIONS

Devin, C., Gupta, A., Darrell, T., Abbeel, P., & Levine, S. (2016). Learning Modular Neural Network Policies for Multi-Task and Multi-Robot Transfer. ArXiv.org. https://arxiv.org/abs/1609.07088 (Year: 2016).*

Andreas, J., Rohrbach, M., Darrell, T., & Klein, D. (2017). Neural Module Networks. ArXiv:1511.02799 [Cs]. https://arxiv.org/abs/1511.02799 (Year: 2017).*

Smith, M. J., Boxerbaum, A., Peterson, G. L., & Quinn, R. D. (2010). Electronic image stabilization using optical flow with inertial fusion. 2010 IEEE/RSJ International Conference on Intelligent Robots and Systems, 1146-1153. https://doi.org/10.1109/iros.2010.5651113 (Year: 2010).*

Pitkänen, P. (2019). Automatic Image Quality Enhancement Using Deep Neural Networks. https://oulurepo.oulu.fi/bitstream/handle/10024/12791/nbnfioulu-201904101454.pdf?sequence=1&isAllowed=y (Year: 2019).*

International Search Report and Written Opinion issued in PCT Application No. PCT/CN2021/089980 dated Jan. 28, 2022.

Extended European Search Report issued in EP Application No. 21938223.1 dated Mar. 6, 2024.

* cited by examiner

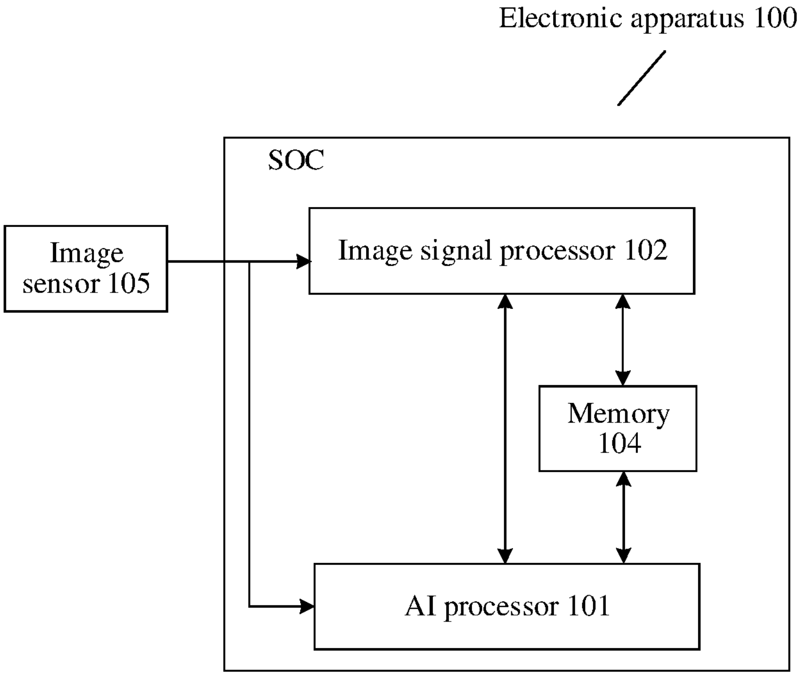

FIG. 1

| Image processing model | Image processing model 01 | Image processing model 02 | Image processing model 03 | Image processing model 04 |
|---|---|---|---|---|
| Scenario information | Low-speed motion state and low ambient light luminance | Low-speed motion state and high ambient light luminance | High-speed motion state and low ambient light luminance | High-speed motion state and high ambient light luminance |

Image sensor 105

Controller 103

Image signal processor (ISP) 102

AI processor 101

801: Image data

802: Obtain light sensitivity information, acceleration data, and three-axis component data 803: Generate motion status data based on the acceleration data and the three-axis component data 804: Generate scenario information Scenario information 805: Update a parameter of an image processing algorithm 806: Process the image data to generate an image signal A Image signal A 807: Select one of a plurality of image processing models to process the image signal A, to generate an image signal B Image signal B 808: Process the image signal B to generate a final image processing result

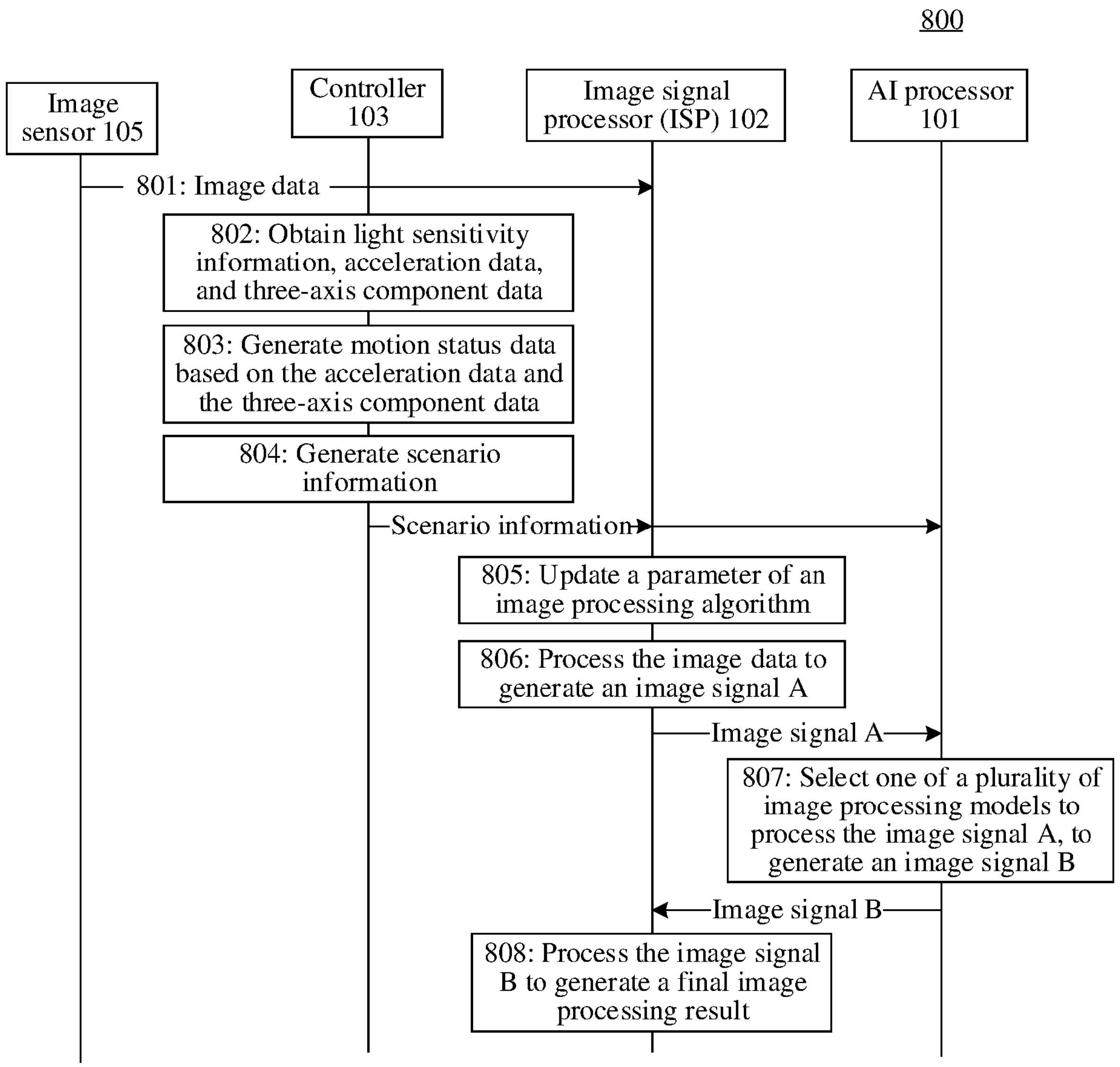

FIG. 8

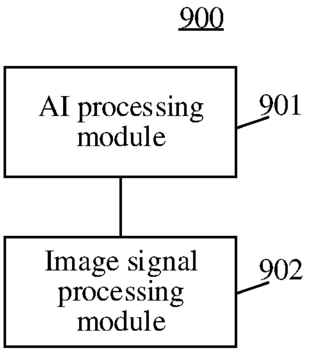

FIG. 9

ELECTRONIC APPARATUS AND IMAGE PROCESSING METHOD OF ELECTRONIC APPARATUS

CROSS-REFERENCE TO RELATED APPLICATIONS

This application is a continuation of International Application No. PCT/CN2021/089980, filed on Apr. 26, 2021, the disclosure of which is hereby incorporated by reference in its entirety.

TECHNICAL FIELD

Embodiments relate to the field of electronic technologies, and in particular, to an electronic apparatus and an image processing method of the electronic apparatus using machine learning/artificial intelligence to improve image processing results.

BACKGROUND

With development of electronic science and technology, more functions are being integrated into an intelligent terminal. Due to development of image processing technologies, more users like to use an intelligent terminal device to perform photographing, video recording, video calling, and the like.

Due to limited computing capability of an algorithm of an image signal processor (ISP) in an intelligent terminal, a technology of combining a conventional image processing algorithm with an artificial intelligence (AI) algorithm to process an image is proposed in the industry to improve an image processing effect. In this proposed solution, the same network model is usually used for processing image signals collected in various scenarios. This increases complexity of a model structure and complexity of a model training process. Due to a limited memory capacity and running speed of a terminal device, it is difficult to deploy and implement the network model in the terminal device. Consequently, in a conventional technology, a problem of a poor image processing effect caused by using a conventional ISP in the terminal device is not yet resolved.

SUMMARY OF EXAMPLE EMBODIMENTS

An electronic apparatus and an image processing method of the electronic apparatus provided can improve an image processing effect.

According to a first aspect, an embodiment provides an electronic apparatus. The electronic apparatus includes: an artificial intelligence AI processor, configured to select a first image processing model from a plurality of image processing models based on scenario information, and perform first image signal processing on a first image signal by using the first image processing model, to obtain a second image signal, where the first image signal is obtained based on first image data output by an image sensor, and the scenario information represents feature classification of the first image signal; and an image signal processor ISP, configured to perform second image signal processing on the second image signal to obtain a first image processing result.

The AI processor runs a plurality of image processing models to process image data collected in a plurality of scenarios, so that complexity of a structure of each image processing model can be reduced. For example, each image processing model may be implemented by using a small quantity of convolutional layers and a small quantity of nodes, so that the image processing model is more easily deployed and run in a terminal device. Because the complexity of the structure of the image processing model is reduced, a running speed of the AI processor, namely, an image processing speed, can be improved. In addition, because each image processing model is dedicated for processing image data in one scenario, an image processing effect can be further improved compared with processing image data collected in the plurality of scenarios by using a same image processing model.

In a possible implementation, the first image signal processing includes at least one of the following processing procedures: noise cancellation, black level correction, shadow correction, white balance correction, demosaicing, chromatic aberration correction, or gamma correction.

In a possible implementation, the scenario information includes at least one of the following: first ambient light luminance information and first motion status information of the electronic device.

In a possible implementation, the AI processor is further configured to: when the first motion status information indicates that the electronic device moves at a speed lower than a preset threshold, process the first image signal based on a previous frame of image signal and an image processing result of the previous frame of image signal.

A current frame of image signal is processed based on a previous frame of image and an image processing result of the previous frame of image, so that an effect of processing the image signal can be further improved.

In a possible implementation, the ISP is configured to: select, based on the scenario information, a first parameter from a plurality of groups of parameters of an image processing algorithm; obtain an updated image processing algorithm based on the first parameter; and perform the second image signal processing on the second image signal by using the updated image processing algorithm.

In a possible implementation, the second image signal processing includes at least one of the following processing procedures: noise cancellation, black level correction, shadow correction, white balance correction, demosaicing, chromatic aberration correction, gamma correction, chromatic aberration correction, or RGB-to-YUV domain conversion.

In a possible implementation, the ISP is further configured to receive the first image data from the image sensor, and perform third image signal processing on the first image data to obtain the first image signal.

In a possible implementation, the ISP is further configured to perform the third image signal processing on the first image data by using the updated image processing algorithm.

In a possible implementation, the electronic apparatus further includes a controller, configured to generate the scenario information based on data collected by at least one sensor. The at least one sensor includes at least one of the following: an acceleration sensor, a gravity sensor, and the image sensor.

In a possible implementation, the third image signal processing includes at least one of the following processing procedures: noise cancellation, black level correction, shadow correction, white balance correction, demosaicing, chromatic aberration correction, or gamma correction.

In a possible implementation, the plurality of image processing models are obtained through training based on a plurality of training sample sets corresponding to a plurality of scenarios. Each of the plurality of training sample sets includes a preprocessed image signal generated by processing sample image data collected in a corresponding scenario and a reference image signal generated by processing the sample image data.

According to a second aspect, an embodiment provides an image processing method of an electronic apparatus. The image processing method includes: controlling an artificial intelligence AI processor to select a first image processing model from a plurality of image processing models based on scenario information, and perform first image signal processing on a first image signal by using the first image processing model, to obtain a second image signal, where the first image signal is obtained based on first image data output by an image sensor, and the scenario information represents feature classification of the first image signal; and controlling an image signal processor ISP to perform second image signal processing on the second image signal to obtain a first image processing result.

Based on the second aspect, in a possible implementation, the controlling an image signal processor ISP to perform second image signal processing on the second image signal to obtain an image processing result includes: controlling the ISP to select, based on the scenario information, a first parameter from a plurality of groups of parameters used for running an image processing algorithm; controlling the ISP to obtain an updated image processing algorithm based on the first parameter; and controlling the ISP to perform the second image signal processing on the second image signal by using the updated image processing algorithm.

According to a third aspect, an embodiment provides an image processing apparatus. The image processing apparatus includes: an AI processing module, configured to select a first image processing model from a plurality of image processing models, and perform first image signal processing on a first image signal by using the first image processing model, to obtain a second image signal, where the first image signal is obtained based on first image data output by an image sensor, and the scenario information represents feature classification of the first image signal; and an image signal processing module, configured to perform second image signal processing on the second image signal to obtain a first image processing result.

In a possible implementation, the scenario information includes at least one of the following: first ambient light luminance information and first motion status information of an electronic apparatus.

In a possible implementation, the image signal processing module is configured to: select, based on the scenario information, a first parameter from a plurality of groups of parameters used for running an image processing algorithm; obtain an updated image processing algorithm based on the first parameter; and perform the second image signal processing on the second image signal by using the updated image processing algorithm.

In a possible implementation, the AI processing module is further configured to: when the first motion status information indicates that the electronic device moves at a speed lower than a preset threshold, process the first image signal based on a previous frame of image signal and an image processing result of the previous frame of image signal.

In a possible implementation, the first image signal processing includes at least one of the following processing procedures: noise cancellation, black level correction, shadow correction, white balance correction, demosaicing, chromatic aberration correction, or gamma correction.

In a possible implementation, the second image signal processing includes at least one of the following processing procedures: noise cancellation, black level correction, shadow correction, white balance correction, demosaicing, chromatic aberration correction, gamma correction, chromatic aberration correction, or RGB-to-YUV domain conversion.

In a possible implementation, the plurality of image processing models are obtained through training based on a plurality of training sample sets corresponding to a plurality of scenarios. Each of the plurality of training sample sets includes a preprocessed image signal generated by processing sample image data collected in a corresponding scenario and a reference image signal generated by processing the sample image data.

According to a fourth aspect, an embodiment provides an electronic apparatus. The electronic apparatus includes a memory and at least one processor. The memory is configured to store computer programs, and the at least one processor is configured to invoke all or some of the computer programs stored in the memory, to perform the method according to the second aspect. The at least one processor includes an AI processor and an ISP. Optionally, the electronic apparatus further includes an image sensor.

According to a fifth aspect, an embodiment provides a system-on-a-chip. The system-on-a-chip includes at least one processor and an interface circuit. The interface circuit is configured to obtain a computer program from outside of the chip system. When the computer program is executed by the at least one processor, the method according to the second aspect is implemented. The at least one processor includes an AI processor and an ISP.

According to a sixth aspect, an embodiment provides a computer-readable storage medium. The computer-readable storage medium stores a computer program. When the computer program is executed by at least one processor, the method according to the second aspect is implemented. The at least one processor includes an AI processor and an ISP.

According to a seventh aspect, an embodiment provides a computer program product. When the computer program product is executed by at least one processor, the method according to the second aspect is implemented. The at least one processor includes an AI processor and an ISP.

It should be understood that, the technical solutions in the second aspect to the seventh aspect are consistent with the technical solutions in the first aspect. Beneficial effects achieved in the various aspects and corresponding feasible implementations are similar, and details already described are not described again.

BRIEF DESCRIPTION OF DRAWINGS

To describe the technical solutions in embodiments more clearly, the following briefly describes the accompanying drawings showing example embodiments. It is clear that the accompanying drawings in the following descriptions show merely some embodiments, and a person of ordinary skill in the art may derive another drawing(s) from these accompanying drawings without creative efforts.

FIG. 1 is a schematic diagram of a hardware structure of an electronic apparatus according to an embodiment;

FIG. 2 is a schematic diagram of application scenarios according to an embodiment;

FIG. 8 is a schematic flowchart of an image processing method according to an embodiment; and FIG. 9 is a schematic diagram of a software structure of an electronic apparatus according to an embodiment.

DESCRIPTION OF EMBODIMENTS

Figure 3:
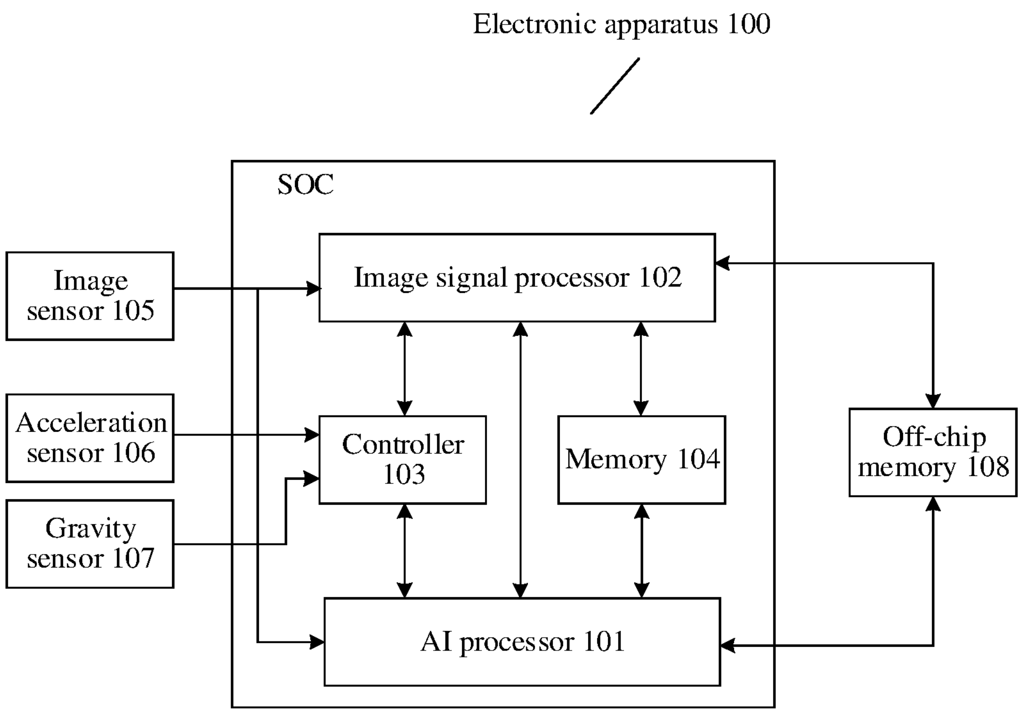
FIG. 3 is a schematic diagram of another hardware structure of an electronic apparatus according to an embodiment.

The following clearly and describes the technical solutions in embodiments with reference to the accompanying drawings in embodiments. It will be apparent that the described embodiments are some but not all of embodiments. All other embodiments obtained by a person of ordinary skill in the art based on embodiments without creative efforts shall fall within the protection scope defined by the claims.

The words "first", "second", and the like mentioned in this specification do not represent any order, quantity, or importance, but are merely used for distinguishing different parts. Likewise, "a/an", "one", or the like is not intended to indicate a quantity limitation either, but is intended to indicate existing at least one. The words such as "coupling" are not limited to a physical or mechanical direct connection, but may include an electrical connection, whether direct or indirect, which is equivalent to a connection in a broad sense.

The term "example" or "for example" in embodiments means "used as an example, an illustration, or a description. Any embodiment or design scheme described as an "example" or "for example" in embodiments should not be explained as being more preferred or having more advantages than another embodiment or design scheme. Exactly, use of the word "example", "for example", or the like is intended to present a related concept in a specific manner. In the descriptions of embodiments, unless otherwise stated, "a plurality of" means two or more than two. For example, a plurality of processors refers to two or more than two processors.

An electronic apparatus provided in embodiments may be an electronic device or a module, a chip, a chipset, a circuit board, or a component integrated in an electronic device. The electronic device may be user equipment (UE), for example, various types of devices such as a mobile phone, a tablet computer, a smart screen, an image capture device, and the like. An image sensor may be disposed in the electronic device, to collect image data. The electronic device may further be installed with various types of software applications, such as a camera application, a video calling application, an online video shooting application, and the like, for driving the image sensor to capture an image. A user may start the various types of applications to take a photo or a video by using the image sensor. The user may further perform, via this type of application, various personalized settings for image beautification. A video calling application is used as an example. The user may select, during a video call, to perform automatic adjustment (for example, "one-click beautification") on an image (for example, a presented facial portrait or a presented background image) to be presented on a screen. After the user starts the various types of applications or starts the various types of applications and selects image beautification, an image processing service supported by the various types of applications in the electronic device may trigger the electronic device to process image data collected by the image sensor, to present a processed image on a screen of the electronic device. Therefore, an image beautification effect is achieved. The image beautification may include, for example, but is not limited to increasing brightness of a part of or all of the image, changing a display color of the image, skinning a facial object presented in the image, adjusting image saturation, adjusting image exposure, adjusting image brightness, adjusting image highlight, adjusting image contrast, adjusting image sharpness, adjusting image clarity, or the like. Image processing described in embodiments may include but is not limited to noise cancellation, black level correction, shadow correction, white balance correction, demosaicing, chromatic aberration correction, gamma correction, or red-green-blue (RGB)-to-YUV (YCrCb) domain conversion, to achieve the image beautification effect. Based on the electronic apparatus in embodiments, in a specific application scenario, when a video call is performed between a user A and a user B, an image presented on a screen of an electronic device used by the user A and an image of the user A presented on a screen of an electronic device used by the user B may be images processed by the electronic apparatus in embodiments, and the processed images are presented until the video call between the user A and the user B ends or the user A disables an image processing service.

Based on the foregoing application scenario, FIG. 1 is a schematic diagram of a hardware structure of an electronic apparatus according to an embodiment. An electronic apparatus 100 may be specifically, for example, a chip, a chipset, a circuit board on which a chip or a chipset is mounted, or an electronic device including the circuit board. However, this is not intended to limit this embodiment. A specific electronic device is described above, and details are omitted herein. The chip, the chipset, or the circuit board on which the chip or the chipset is mounted may work under software control. The electronic apparatus 100 includes one or more processors, for example, an AI processor 101 and an ISP 102. Optionally, the one or more processors may be integrated into one or more chips. The one or more chips may be considered a chipset. When the one or more processors are integrated into a same chip, the chip is also referred to as a system-on-a-chip (SOC). In addition to the one or more processors, the electronic apparatus 100 further includes one or more other components, such as a memory 104 and an image sensor 105. In a possible implementation, the memory 104, the AI processor 101, and the ISP 102 may be located in a same system-on-a-chip in the electronic apparatus 100. In other words, the memory 104 is integrated into the SOC shown in FIG. 1.

The AI processor 101 shown in FIG. 1 may include a dedicated neural processor such as a neural-network processing unit (NPU) and the like, and includes but is not limited to a convolutional neural network processor, a tensor processor, or a neural processing engine. The AI processor may be independently used as a component or integrated into another digital logic device. The digital logic device includes but is not limited to a CPU (central processing unit), a GPU (graphics processing unit), or a DSP (digital signal processor). For example, the CPU, the GPU, and the DSP are all processors in the system-on-a-chip. The AI processor 101 may run a plurality of image processing models, and the plurality of image processing models are configured to perform image processing operations in a plurality of scenarios. One of the image processing models is configured to perform an image processing operation in one of the scenarios. For example, the plurality of scenarios include a scenario in which external ambient light luminance is high and a scenario in which external ambient light luminance is low. The AI processor 101 may run two image processor models. One image processing model is configured to perform an image processing operation in the high ambient light luminance scenario, and the other image processing model is configured to perform an image processing operation in the low ambient light luminance scenario. In a possible implementation, the plurality of scenarios may be classified based on preset scenario information. The scenario information may include but is not limited to at least one of the following: ambient light luminance information and motion status information of the electronic device. In this embodiment, the scenario information represents feature classification of an image signal to be processed by the AI processor. The scenario information may include the ambient light luminance information and the motion status information of the electronic device. Specifically, features of an image signal may include but are not limited to a noise feature, a shadow feature, a white balance feature, and the like. The feature classification includes a motion feature and an ambient light luminance feature. For example, ambient light luminance may be classified into low ambient light luminance and high ambient light luminance, or a motion status may be classified into a high-speed motion state and a low-speed motion state. The feature classification may indicate a magnitude of noise of the image signal, a size of a shadow in the image signal, or the like. When scenarios in which image data is collected are different, feature categories of image signals corresponding to the collected image data are different. The AI processor may learn of, by using the scenario information, a feature of an image signal corresponding to image data. Therefore, the AI processor 101 may run one of the image processing models based on the scenario information to perform image processing. Each of the plurality of image processing models may perform one or more image processing procedures. The one or more image processing procedures may include but are not limited to noise reduction, black level correction, shadow correction, white balance correction, demosaicing, chromatic aberration correction, gamma correction, or RGB-to-YUV domain conversion. Each image processing model is obtained, based on sample image data collected in a corresponding scenario, through training by using a machine learning method. For a method for training the image processing model, refer to an embodiment shown in FIG. 7. It should be noted that the plurality of image processing models run in the AI processor 101 are all configured to perform a same image processing operation. For example, the plurality of image processing models run in the AI processor 101 are all configured to perform an image processing operation of noise reduction. Based on different scenario information, levels of noise reduction performed by the image processing models are different. For example, in a high ambient light luminance scenario, noise of an image signal is low, and a level of noise reduction performed by an image processing model corresponding to the high ambient light luminance scenario is low. In a low ambient light luminance scenario, noise of an image signal is high, and a level of noise reduction performed by an image processing model corresponding to the low ambient light luminance scenario is high. In this embodiment, the AI processor 101 runs the plurality of image processing models to process the image data collected in the plurality of scenarios, so that complexity of each image processing model can be reduced. For example, each image processing model may be implemented by using a small quantity of convolutional layers and a small quantity of nodes. Therefore, a running speed of the AI processor 101, namely, an image processing speed is improved. In addition, because each image processing model is dedicated for processing image data in one scenario, an image processing effect can be further improved compared with processing image data collected in the plurality of scenarios by using a common image processing model for multiple scenarios.

The plurality of image processing models run in the AI processor 101 are described in more detail by using an example in which the scenario information includes the ambient light luminance information and the motion status information of the electronic device. In this embodiment, motion status of the electronic device may be divided into a plurality of motion status intervals in descending order of motion speeds of the electronic device. For example, the motion status of the electronic device is divided into five motion status intervals: a first motion status to a fifth motion status. Similarly, ambient light luminance may be classified into a plurality of luminance intervals in ascending order of luminance. For example, the ambient light luminance is divided into five luminance intervals: first luminance to fifth luminance. Then, a motion status interval and a luminance interval are randomly combined to obtain a plurality of combinations of the motion status and the luminance. Each of the plurality of combinations corresponds to one image processing model. In other words, the plurality of combinations correspond respectively to the plurality of image processing models. In this embodiment, with reference to an application scenario shown in FIG. 2, descriptions are provided by using an example in which the motion status of the electronic device is classified into the high-speed motion state and the low-speed motion state (where a static status may be classified into the low-speed motion state) and the ambient light luminance is classified into the low ambient light luminance and the high ambient light luminance.

As shown in FIG. 2, the motion status of the electronic device is classified into a low-speed motion state and a high-speed motion state, and ambient light luminance is classified into low ambient light luminance and high ambient light luminance. The AI processor 101 may run four image processing models. An image processing model 01 is configured to perform an image processing operation on image data collected in a low-speed motion state and low ambient light luminance scenario. An image processing model 02 is configured to perform an image processing operation on image data collected in a low-speed motion state and high ambient light luminance scenario. An image processing model 03 is configured to perform an image processing operation on image data collected in a high-speed motion state and low ambient light luminance scenario. An image processing model 04 is configured to perform an image processing operation on image data collected in a high-speed motion state and high ambient light luminance scenario. See below: See below:

| | Motion State | Ambient Light Luminance |
|---|---|---|
| Image Processing Model 01 | Low | Low |
| Image Processing Model 02 | Low | High |
| Image Processing Model 03 | High | Low |
| Image Processing Model 04 | High | High |

The AI processor 101 runs one of the four image processing models based on the scenario information to perform image processing. For example, it is assumed that the scenario information indicates a high-speed motion state and high ambient light luminance. In this case, the AI processor 101 runs the image processing model 04 to process image data.

In a possible implementation of this embodiment, when the scenario information includes the motion status information of the electronic device, an image processing model corresponding to the low-speed motion state (in other words, the electronic device moves at a speed lower than a preset threshold) may be obtained through training a recurrent neural network based on a training sample. In a low-speed motion state scenario, when running the image processing model to process a current frame of image signal, the AI processor may further input at least one of a previous frame of image signal and an image processing result of the previous frame of image signal, and the current frame of image signal to the image processing model. The image processing model may process the current frame of image signal based on the previous frame of image signal and the image processing result of the previous frame of image signal.

The scenario information in this embodiment may be delivered to the AI processor 101 by a controller running in the electronic device 100. In a possible implementation, the AI processor 101 may pre-store a table of a first mapping relationship between the scenario information and storage address information of the image processing model. After obtaining the scenario information, the AI processor 101 may query the table of the first mapping relationship, to obtain address information of a corresponding image processing model. Finally, the AI processor 101 may load the image processing model from an address indicated by the obtained address information. In another possible implementation, the first mapping relationship table may alternatively be pre-stored in the controller. After obtaining the scenario information, the controller may directly deliver storage address information of the image processing model to the AI processor 101 based on the table of the first mapping relationship. For a specific manner of determining the scenario information, refer to related descriptions in the following embodiment shown in FIG. 3. Already disclosed details are not repeated.

In the ISP 102 shown in FIG. 1, a plurality of hardware modules may be disposed or a software program may be run to process an image. The ISP 102 performs a plurality of image processing procedures by running an image processing algorithm. The plurality of image processing procedures may include but are not limited to tone mapping, contrast enhancement, edge enhancement, noise reduction, color correction, and the like. In the image processing algorithm run in the ISP 102, values of some parameters are adjustable, for example, a spatial domain Gaussian kernel parameter and a pixel value range Gaussian kernel parameter in an image processing algorithm configured to perform a noise reduction process. In a possible implementation, values of a plurality of groups of adjustable parameters may be preset in the ISP 102, and the values of the plurality of groups of adjustable parameters correspond to image processing in the plurality of scenarios. A value of each of one group of adjustable parameters corresponds to image processing in one of the scenarios. The plurality of scenarios may also be classified based on scenario information. The scenario information herein is the same as the scenario information for setting the image processing model. For details, refer to the related descriptions. Details already disclosed are not described herein again. The ISP 102 may select values of a group of adjustable parameters based on the scenario information, and update an image processing algorithm of a corresponding part based on the values of the selected adjustable parameter. For example, in the plurality of image processing procedures performed by the ISP 102, only a parameter of the image processing algorithm for noise reduction is adjustable, and parameters of other image processing procedures do not need to be adjusted. The ISP 102 may update only the image processing algorithm for noise reduction based on a value of the selected parameter, and then process the image signal by using an updated image processing algorithm. A correspondence between a value of an adjustable parameter in the ISP 102 and a scenario is described by still using the example in which the scenario information includes the ambient light luminance information and the motion status information of the electronic device, the motion status of the electronic device includes the high-speed motion state and the low-speed motion state, and the ambient light luminance includes the low luminance and the high luminance. Values of four groups of adjustable parameters may be preset in the ISP 102. Values of a first group of adjustable parameters correspond to a low-speed motion state and low luminance scenario, values of a second group of adjustable parameters correspond to a low-speed motion state and high luminance scenario, values of a third group of adjustable parameters correspond to a high-speed motion state and low luminance scenario, and values of a fourth group of adjustable parameters correspond to a high-speed motion state and high luminance scenario. For example, when it is assumed that the scenario information indicates a high-speed motion state and high luminance, the ISP 102 updates, by using the value of the fourth group of adjustable parameters, a related image processing algorithm run in the ISP 102, and then processes the image signal by using an updated image processing algorithm. In a possible implementation, the ISP 102 may pre-store a table of a second mapping relationship between the scenario information and the value of the adjustable parameter. The ISP 102 may query the table of the second mapping relationship based on the scenario information, to obtain the value of the corresponding adjustable parameter.

In this embodiment, the AI processor 101 and the ISP 102 may cooperate with each other to process image data collected in a same scenario. Specifically, image data obtained from the image sensor 105 may experience a plurality of image processing procedures, so that a final image processing result is generated. The plurality of image processing procedures may include but are not limited to noise reduction, black level correction, shadow correction, white balance correction, demosaicing, chromatic aberration correction, gamma correction, or RGB-to-YUV domain conversion. The AI processor 101 may perform one or more processes in the foregoing image processing procedures by running the image processing model, that is, corresponding to the foregoing one or more image processing operations. The ISP 102 may also perform one or more processes in the foregoing image processing procedures by running the image processing algorithm. Therefore, an entire image processing procedure includes a plurality of processing procedures, and the plurality of processing procedures are allocated to the AI processor 101 and the ISP 102 as tasks. The AI processor 101 and the ISP 102 may perform different image processing procedures, or the AI processor 101 and the ISP 102 may perform the same image processing process. When the AI processor 101 and the ISP 102 perform the same image processing process, image processing performed by the AI processor 101 may be used as an enhancement or a supplement to the image processing process. For example, when the AI processor 101 and the ISP 102 simultaneously perform a noise cancellation process, the ISP 102 is configured to perform initial noise canceling, and the AI processor 101 is configured to perform secondary noise canceling based on the initial noise canceling of the ISP 102. In a possible implementation, the ISP 102 and the AI processor 101 may communicate through an electronic circuit connection. The electronic circuit connection between the AI processor 101 and the ISP 102 is also referred to as a physical connection or an interrupt connection. The interrupt connection includes an interrupt signal processing hardware circuit configured to implement functions of sending and receiving interrupt signals and a connection line for transmitting or receiving a signal, to implement receiving and sending of the interrupt signals. The interrupt signal processing hardware circuit includes but is not limited to a conventional interrupt controller circuit. For a specific implementation solution of the interrupt signal processing hardware circuit, refer to related descriptions of an interrupt controller in a conventional technology. Details are not described herein again. For specific implementation of a specific connection and cooperation between the AI processor 101 and the ISP 102 for processing an image, refer to related descriptions of embodiments shown in FIG. 4 to FIG. 6.

In an embodiment, an electronic device 100 further includes a controller 103, as shown in FIG. 3. The controller 103 may be an integrated controller. During specific implementation, the controller 103 may be various digital logic devices or circuits, including but not limited to a CPU, a GPU, a microcontroller, a microprocessor, a DSP, or the like. The controller 103, an AI processor 101, and an ISP 102 may be located in a same system-on-a-chip in the electronic apparatus 100. In other words, the controller 103 is integrated into the SOC shown in FIG. 1. In addition, the controller 103 may alternatively be disposed separately from the AI processor 101, the ISP 102, and a memory 104. This is not limited in this embodiment. Further, the controller 103 and the AI processor 101 may be integrated into a same logical operation device (for example, a CPU), and the same logical operation device implement functions performed by the controller 103 and the AI processor 101 in this embodiment. The controller 103 runs a software program or a software plug-in to drive the controller 103 to obtain the foregoing scenario information, and then sends the obtained scenario information to the AI processor 101 and the ISP 102 respectively. When the scenario information includes ambient light luminance information, in a possible implementation, the ambient light luminance information may be generated by the controller 103 based on light sensitivity information of image data. The light sensitivity information of the image data may be calculated by an exposure compensation module in the ISP 102 by running a corresponding algorithm. The ambient light luminance information may be a bit signal. A plurality of light sensitivity interval segments (for example, a low light sensitivity interval segment and a high light sensitivity interval segment) may be preset in the controller 103. The controller 103 may compare the obtained light sensitivity information with thresholds of the plurality of light sensitivity interval segments, and generate a bit signal based on a comparison result. When the scenario information includes motion status information of the electronic device, in a possible implementation, the motion status information of the electronic device may be generated by the controller 103 based on acceleration data of the electronic device and three-axis component (X-axis, Y-axis, and Z-axis) data of the electronic device. The motion status information of the electronic device may be a bit signal. Similarly, a plurality of motion speed interval segments (for example, a low motion speed interval segment and a high motion speed interval segment) may be preset in the controller 103. The controller 103 may generate motion status data based on the acceleration data and the three-axis component data, compare the generated motion status data with thresholds of the plurality of motion speed interval segments, and generate a bit signal based on a comparison result. The acceleration data may be collected by an acceleration sensor, and the three-axis component data of the electronic device may be collected by a gravity sensor. In this case, the electronic device 100 may further include an acceleration sensor 106 and a gravity sensor 107, as shown in FIG. 3. The scenario information may use a two-bit signal, where a first bit indicates ambient light luminance, and a second bit indicates a motion status of the electronic device. For example, "00" indicates low ambient light luminance and a low motion status; "01" indicates low ambient light luminance and a high motion status; "10" indicates high ambient light luminance and a low motion status; and "11" indicates high ambient light luminance and a high motion status. It should be noted that a quantity of bits indicating the scenario information in this embodiment is merely an example. The quantity of bits may include more bits or fewer bits based on specifically included scenario information and an interval obtained through classification based on each scenario. For example, when a luminance interval includes low luminance, medium luminance, and high luminance, a bit indicating luminance may include three bits. It should be further noted that, in a plurality of value interval segments that are preset in the controller 103 and that are used for classifying different scenarios, an overlapping interval is set between every two adjacent value interval segments. It is assumed that when scenario information currently generated by the controller 103 falls within the overlapping interval, the controller 103 may refer to scenario information generated previously (last time). If a difference between the currently generated scenario information and the scenario information generated last time is less than or equal to a preset threshold, the AI processor 101 may maintain an image processing model currently run in the AI processor 101 unchanged, and the ISP 102 may maintain an image processing algorithm currently run in the ISP 102 unchanged. If a difference between the currently generated scenario information and the scenario information generated last time is greater than a preset threshold, the currently generated scenario information may be resent to the AI processor 101 and the ISP 102, so that the AI processor 101 changes an image processing model, and the ISP 102 changes a parameter of an image processing algorithm. In this embodiment, the overlapping interval is set between every two adjacent value interval segments, so that frequent switching of the image processing model run in the AI processor 101 can be avoided, and stability of the image processing model run in the AI processor 101 is improved.

In this embodiment, the controller 103 may obtain the scenario information in real time or periodically. When detecting that the current scenario information is different from the previously obtained scenario information (for example, a high luminance and low motion status scenario is converted into a high luminance and high motion status scenario), the controller 103 sends the scenario information indicating a current scenario to the ISP 102 and the AI processor 101 in time. The AI processor 101 changes, based on the currently received scenario information, the image processing model run in the AI processor 101 in time. Therefore, when image processing is performed, a changed image processing model is run in a next image processing periodicity. The ISP 102 may further change, based on the currently received scenario information, the parameter of the image processing algorithm run in the ISP 102 in time. Therefore, when image processing is performed, an image processing algorithm whose parameter is updated is run in a next image processing periodicity. Therefore, the electronic apparatus in this embodiment can dynamically adjust, based on the scenario information, the used image processing model and the parameter of the image processing algorithm run in the ISP 102. Therefore, when a user uses the electronic apparatus in this embodiment to change a scenario (for example, change from a strong light region to a weak light region or change an electronic device from a static status to a motion status), a captured image can be processed in a targeted manner. This improves an image processing effect and helps improve user experience.

Figure 4:
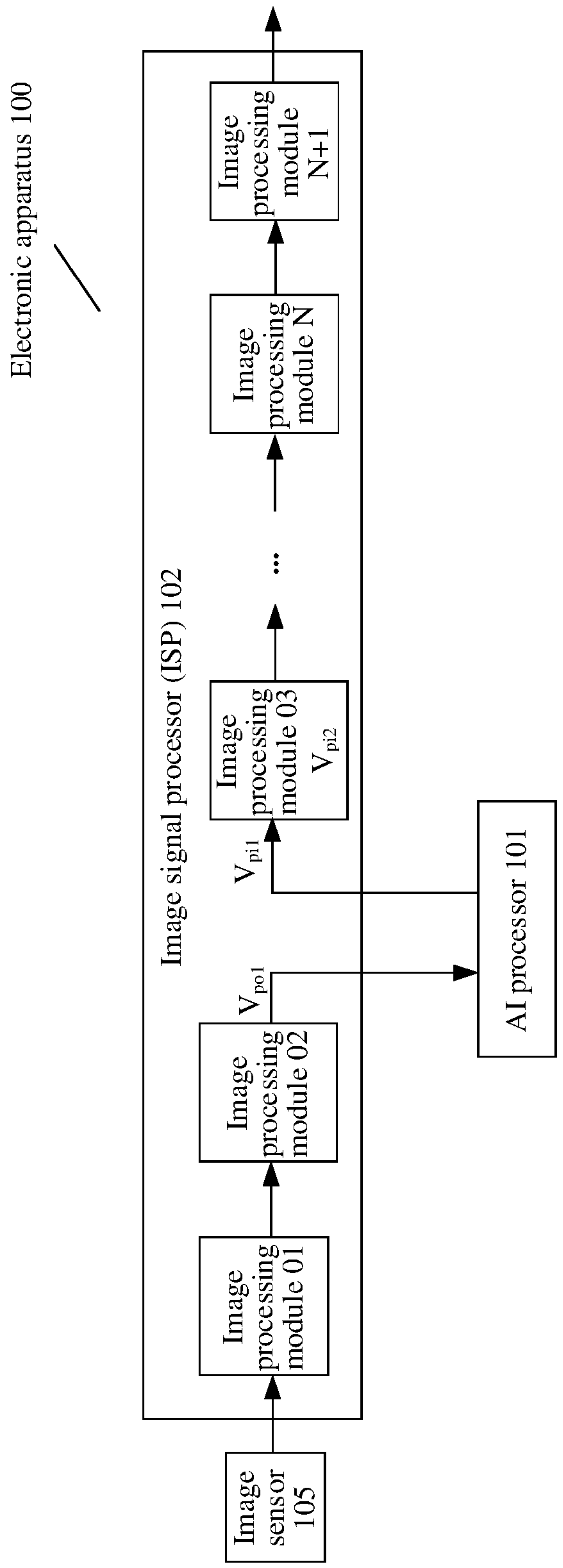
FIG. 4 is a schematic diagram of still another hardware structure of an electronic apparatus according to an embodiment.

FIG. 4 is a schematic diagram of a structure of a connection between an ISP 102 and an AI processor 101 through an electronic circuit according to an embodiment. In an electronic apparatus 100 shown in FIG. 4, an ISP 102 may include a plurality of cascaded image processing modules. The plurality of cascaded image processing modules include an image processing module 01, an image processing module 02, an image processing module 03, . . . , an image processing module N, and an image processing module N+1. Each image processing module may include a plurality of logic devices or circuits to perform a specific image processing function. For example, the image processing module 01 is configured to perform image processing of black level correction, the image processing module 02 is configured to perform image processing of shadow correction, the image processing module 03 is configured to perform image processing of chromatic aberration correction, . . . , and the image processing module N+1 is configured to perform processing of RGB-to-YUV conversion. Based on an image processing requirement, an output port and an input port may be disposed in any one of the plurality of cascaded image processing modules. The output port is configured to provide an image signal A to the AI processor 101, and the input port is configured to obtain an image signal B from the AI processor 101. FIG. 4 schematically shows that an output port $V_{po1}$ is disposed in the image processing module 02, and an input port $V_{pi1}$ is disposed in the image processing module 03. Based on the structure shown in FIG. 4, in a possible implementation, an on-chip RAM may be disposed in the electronic apparatus 100. The on-chip RAM, the ISP 102, and the AI processor 101 are integrated into a chip in the electronic apparatus 100. Both an image signal provided by the ISP 102 to the AI processor 101 and an image signal provided by the AI processor 101 to the ISP 102 may be stored in the on-chip RAM. In addition, the on-chip RAM is further configured to store intermediate data generated in a running process of the AI processor 101, weight data of each network node in a neural network run in the AI processor 101, and the like. During specific implementation, the on-chip RAM may be disposed in the memory 104 shown in FIG. 1 or FIG. 3.

In a specific scenario, the ISP 102 obtains image data from an image sensor 105. The image processing module 01 performs shadow correction processing and the image processing module 02 performs white balance correction processing sequentially on the image data, to generate an image signal A, and the image signal A is stored in the on-chip RAM. The image processing module 02 stores the image signal A in the on-chip RAM, and then sends an interrupt signal Z1 to the AI processor 101. The AI processor 101 obtains the image signal A from the on-chip RAM in response to the interrupt signal Z1. The AI processor 101 performs demosaicing processing on the image signal A to generate an image signal B, and stores the image signal B in the on-chip RAM. The AI processor 101 stores the image signal B in the on-chip RAM, and then sends an interrupt signal Z2 to the image processing module 03. The image processing module 03 reads the image signal B from the on-chip RAM in response to the interrupt signal Z2. The image processing module 03 performs chromatic aberration correction processing, . . . , the image processing module N performs gamma correction processing, and the image processing module N+1 performs RGB-to-YUV domain conversion processing sequentially on the image signal B, to generate a final image processing result, where the image processing module 03, . . . , the image processing module N, and the image processing module N+1 are in the ISP 102. It should be noted that more image processing modules may be further included before the image processing module 01, so that the ISP 102 performs more image processing procedures on the image data.

Figure 5:
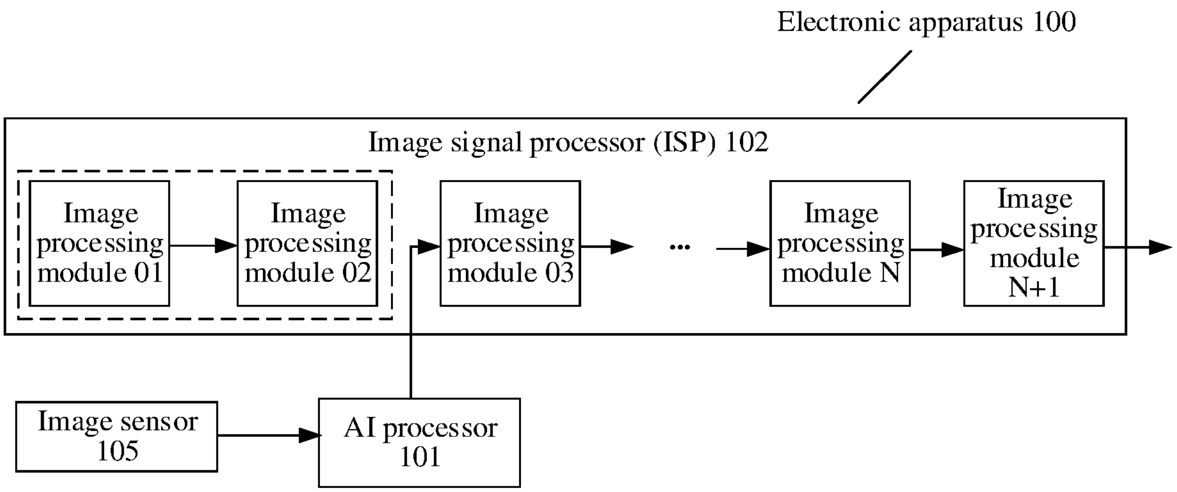
FIG. 5 is a schematic diagram of yet another hardware structure of an electronic apparatus according to an embodiment.

In the embodiment shown in FIG. 4, an image processing process performed by the AI processor 101 is set among a plurality of image processing procedures performed by the ISP 102, to replace or supplement some intermediate image processing procedures performed by the ISP 102. In some other possible implementations, the AI processor 101 may directly obtain image data from the image sensor 105, to perform a front-end image processing process. In this implementation, the AI processor 101 may replace and supplement some front-end image processing modules in the ISP 102, to perform corresponding image processing procedures. In this case, the AI processor 101 may directly communicate with an image processing module behind the ISP 102. For a hardware structure of this implementation, refer to FIG. 5. A connection and interaction between an AI processor 101 and an ISP 102 shown in FIG. 5 are similar to the connection and interaction between the AI processor 101 and the ISP 102 shown in FIG. 4. For details, refer to the related descriptions in the embodiment shown in FIG. 4. Details already described are not described herein again.

Figure 6:
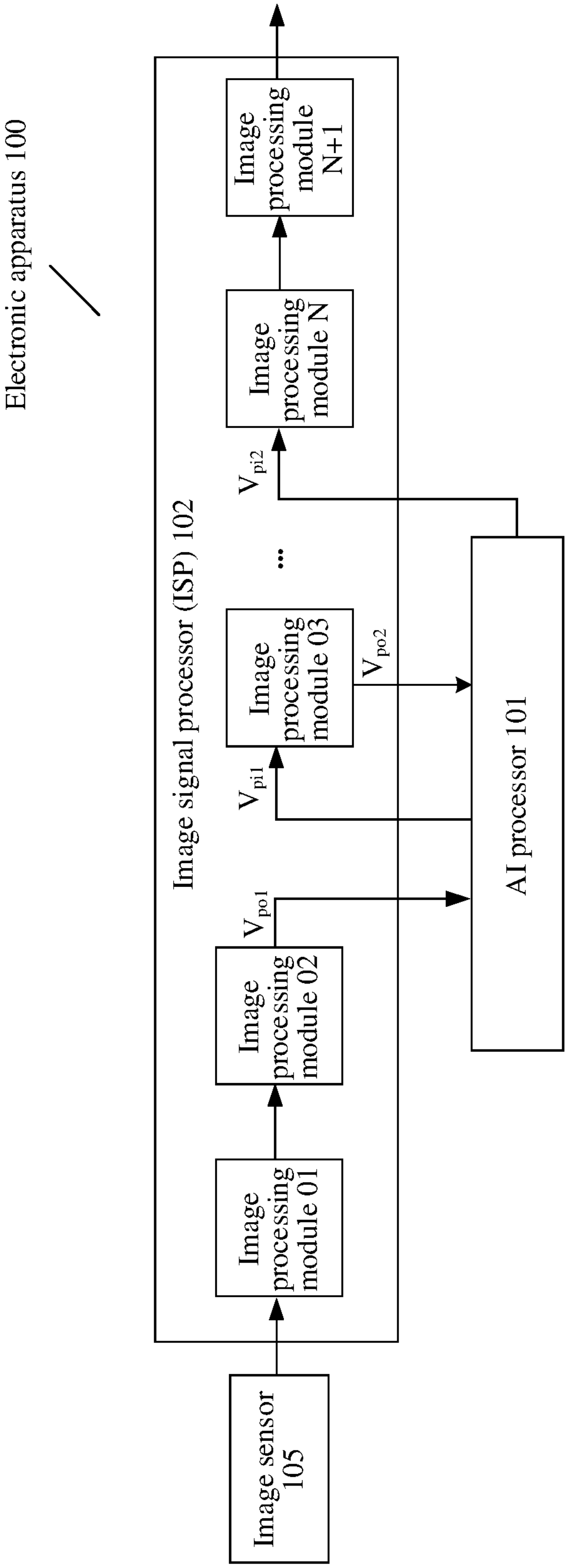
FIG. 6 is a schematic diagram of still yet another hardware structure of an electronic apparatus according to an embodiment.

In embodiments shown in FIG. 4 and FIG. 5, the AI processor 101 interacts with the ISP 102 once, and the AI processor 101 performs one image processing process or performs a plurality of continuous image processing procedures to process image data or an image signal. In some other possible implementations, the AI processor 101 may perform a plurality of discontinuous image processing procedures. In other words, the AI processor 101 and the ISP 102 may alternately perform image processing, so that the AI processor 101 and the ISP 102 jointly complete an image processing process, to obtain a processing result, to replace an image processing process of a conventional ISP. In this case, the ISP 102 may further include more output ports and more input ports. The following uses a structure of an electronic apparatus shown in FIG. 6 as an example for description. In FIG. 6, an output port $V_{po1}$ and an output port $V_{po2}$ are respectively disposed in an image processing module 02 and an image processing module 03 in an ISP 102, and an input port $V_{pi1}$ and an input port $V_{pi2}$ are respectively disposed in an image processing module 03 and an image processing module N. An output port of each module is configured to provide an image signal to an AI processor, and an input port of each module is configured to obtain an image signal from the AI processor. An image processing module 01 and the image processing module 02 process image data collected by an image sensor 105, to generate an image signal A, and the image signal A is provided to the AI processor 101. The AI processor 101 processes the image signal A, to generate an image signal B, and the image signal B is provided to the image processing module 03. The image processing module 03 processes the image signal B, to generate an image signal C, and the image signal C is provided to the AI processor 101. The AI processor processes the image signal C, to generate an image signal D, and the image signal D is provided to the image processing module N. The image processing module N and the image processing module N+1 process the image signal D, to generate a final image processing result.

Based on the schematic diagram of the structure shown in FIG. 6, in the plurality of image processing models run in the AI processor 101, at least one first image processing model performs a first image processing operation, and at least one second image processing model performs a second image processing operation. Herein, when there are a plurality of first image processing models, the plurality of first image processing models are configured to process image data collected in different scenarios, and first image processing operations performed by the plurality of first image processing models are the same. Similarly, when there are a plurality of second image processing models, the plurality of second image processing models are configured to process image data collected in different scenarios, and second image processing operations performed by the plurality of second image processing models are the same. For example, it is assumed that the AI processor 101 may run two first image processing models and two second image processing models. One first image processing model is configured to perform noise reduction processing on image data collected in a high ambient light luminance scenario, and the other first image processing model is configured to perform noise reduction processing on image data collected in a low ambient light luminance scenario. One second image processing model is configured to perform demosaicing processing on the image data collected in the high ambient light luminance scenario, and the other first image processing model is configured to perform demosaicing processing on the image data collected in the low ambient light luminance scenario.

In a possible implementation of this embodiment, the electronic apparatus further includes an off-chip memory 108, as shown in FIG. 3. Because the off-chip memory 108 has larger storage space, it may replace an on-chip RAM, to store a larger unit of image data. The off-chip memory 108 may be configured to store a plurality of frames of images. The plurality of frames of images may be a previous frame of image, a previous two frames of images, or a plurality of previous frames of images before a current image. In addition, the off-chip memory 108 may be further configured to store a feature map of each of the plurality of frames of images. The feature map is generated by an image processing model running in the AI processor 101 performing a convolution operation or a pooling operation on an image signal. When running the image processing model generated by a recurrent neural network to process a current image signal, the AI processor 101 may further obtain a previous frame of image signal of the current image signal or a feature map of a previous frame of image signal from the off-chip memory 108, and then process the current image signal by using the previous frame of image signal or the feature map of the previous frame of image signal as reference data. In addition, the AI processor 101 may further store a processed image signal in the off-chip memory 108. The off-chip memory 108 may include a random access memory (RAM). The random access memory may include a volatile memory (such as an SRAM, a DRAM, a DDR (double data rate SDRAM), an SDRAM, or the like) and a non-volatile memory.

In this embodiment, the electronic apparatus 100 may further include a communication unit (which is not shown in the figure), and the communication unit includes but is not limited to a short-range communication unit or a cellular communication unit. The short-range communication unit performs information interaction with a terminal that is located outside a mobile terminal and is configured to access an internet by running a short-range wireless communication protocol. The short-range wireless communication protocol may include but is not limited to various protocols supported by a radio frequency identification technology, a Bluetooth communication technology protocol, an infrared communication protocol, or the like. The cellular communication unit accesses the internet by running a cellular radio communication protocol and a radio access network, to implement information interaction between a mobile communication unit and a server that supports various applications and that is in the internet. The communication unit may be integrated into a same SOC with the AI processor 101, the ISP 102, and the like in the foregoing embodiments, or may be disposed separately. In addition, the electronic apparatus 100 may optionally further include a bus, an input/output I/O port, a storage controller, or the like. The storage controller is configured to control a memory 104 and the off-chip memory 108. The bus, the input/output I/O port, the storage controller, and the like may be integrated into a same SOC with the ISP 102, the AI processor 101, and the like. It should be understood that, during actual application, the electronic apparatus 100 may include more or fewer components than those shown in FIG. 1 or FIG. 3. This is not limited in embodiments.

Figure 7:
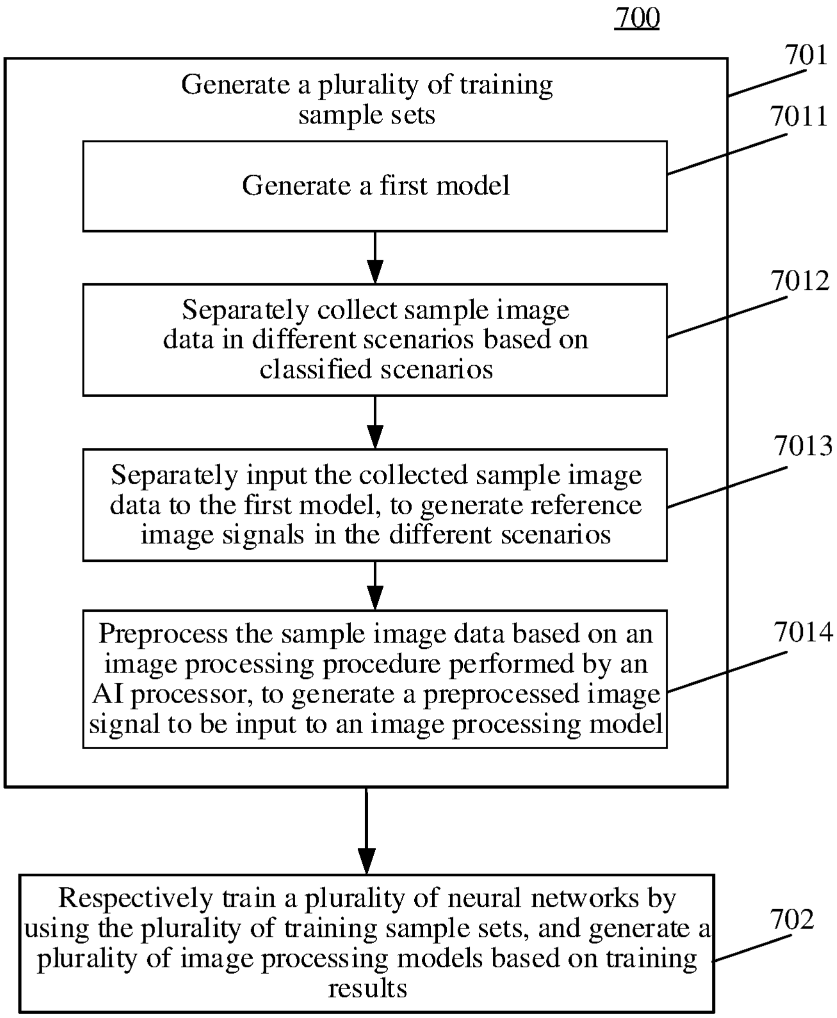
FIG. 7 is a schematic flowchart of a training method for an image processing model run in an AI processor according to an embodiment.

In embodiments, each of a plurality of image processing models runs in an AI processor and is deployed in an electronic device after a plurality of neural networks are trained, by using a machine learning method, on an offline end based on sample image data collected in a corresponding scenario. FIG. 7 shows a schematic procedure 700 of a training method for an image processing model run in an AI processor. With reference to FIG. 7, training of the image processing model is described.

Step 701: Generate a plurality of training sample sets. The step of generating the plurality of training sample sets may include the following substeps: Step 7011: Generate a first model. The first model is an end-to-end model, generated on an offline end, and the first model may process image data collected in any scenario. The first model may be obtained through training based on a training sample by using a conventional model training method. Step 7012: Separately collect sample image data in different scenarios based on classified scenarios. Step 7013: Separately input the collected sample image data to the first model, to generate reference image signals in the different scenarios. Step 7014: Preprocess the sample image data based on an image processing procedure performed by the AI processor, to generate a preprocessed image signal to be input to an image processing model. The plurality of training sample sets may be obtained based on step 7011 to step 7014. The training sample sets are in a one-to-one correspondence with scenarios, and each training sample set includes a preprocessed image signal generated by processing sample image data collected in a scenario, and a reference image signal generated by processing, by using the first model, the sample image data collected in the scenario.

Step 702: Respectively train a plurality of neural networks by using the plurality of training sample sets, and generate a plurality of image processing models based on training results. The neural networks may include but are not limited to a recurrent neural network, a convolutional neural network, or a deep neural network. During specific implementation, for a scenario in which an electronic device is static or moves at a low speed, any one of the following networks may be trained: the recurrent neural network, the convolutional neural network, and the deep neural network, to obtain an image processing model. For a scenario in which the electronic device moves at a high speed, any one of the following networks may be trained: the convolutional neural network and the deep neural network, to obtain an image processing model. Preferably, for the scenario in which the electronic device is static or moves at a low speed, to further improve an image signal processing effect, the recurrent neural network may be trained to obtain an image processing model. The following provides detailed descriptions by using an example in which one of the training sample sets is used for training one of the neural networks, where the neural network is the convolutional neural network. A preprocessed image signal is input to the neural network to obtain an output image signal. The output image signal is compared with a reference image signal, and a loss function is constructed based on a difference between the output image signal and the reference image signal. The loss function includes a weight parameter of the neural network. The weight parameter of the neural network is iteratively adjusted by using a back propagation algorithm and a gradient descent algorithm. When a preset condition is satisfied, a parameter of the neural network is stored. A neural network that satisfies the preset condition is an image processing model. The preset condition may include at least one of the following: A loss value of a preset loss function is less than or equal to a preset threshold, and a quantity of times of iteratively adjusting the neural network is greater than or equal to a preset threshold.

Based on the foregoing embodiments, an embodiment further provides an image processing method. The image processing method may be applied to the electronic apparatus 100 shown in any one of FIG. 1 and FIG. 3 to FIG. 6. With reference to the electronic apparatus 100 shown in FIG. 3 and FIG. 4, the image processing method provided in this embodiment is described by using an example in which scenario information includes ambient light luminance information and motion status information of an electronic device. FIG. 8 is a procedure 800 of an image processing method according to an embodiment. The image processing method, the image processing method includes the following steps: Step 801: An image sensor 105 collects image data, and provides the collected image data to an ISP 102.

Step 802: A controller 103 obtains light sensitivity information of the image data from the ISP 102, obtains acceleration data of an electronic device from an acceleration sensor, and obtains three-axis component data of the electronic device from a gravity sensor. Step 803: The controller 103 generates motion status data of the electronic device based on the acceleration data and the three-axis component data. Step 804: The controller 103 compares the light sensitivity information with a plurality of preset light sensitivity interval segments, compares the motion status data with a plurality of preset motion speed interval segments, and generates, based on comparison results, scenario information including ambient light luminance information and motion status information, and provides the scenario information to an AI processor 101 and the ISP 102 respectively. The ambient light luminance information indicates low ambient light luminance, and the motion status information indicates that the electronic device moves at a low speed.

Step 805: The ISP 102 updates a parameter of an image processing algorithm based on the scenario information. Step 806: Process the image data by using an updated image processing algorithm, to generate an image signal A. Step 807: The AI processor 101 selects, based on the scenario information, one of a plurality of image processing models to process the image signal A, to generate an image signal B. Step 808: The ISP 102 processes the image signal B to generate a final image processing result.

It should be understood that the steps or the operations of the image processing method shown in FIG. 8 are merely examples. In this embodiment, other operations or variations of the operations in FIG. 8 may be further performed. This embodiment may further include more or fewer steps than the steps shown in FIG. 8. For example, when no parameter adjustment unit is set in the ISP 102, and the ISP 102 uses a same parameter to process images collected in different scenarios, in step 804, the controller 103 may not need to provide the scenario information to the ISP 102, and step 805 may be omitted. For another example, when the image processing method in this embodiment is applied to the electronic apparatus 100 shown in FIG. 6, step 808 is replaced with that the ISP 102 processes the image signal B to generate an image signal C. After step 808, the method further includes steps that the AI processor 101 processes the image signal C to generate an image signal D, and the ISP 102 processes the image signal D to generate a final image processing result.

It may be understood that, to implement the foregoing functions, the electronic apparatus includes corresponding hardware and/or software modules for performing the functions. In combination with steps in the examples described in embodiments disclosed in this specification, this application may be implemented by hardware or a combination of hardware and computer software. Whether a function is performed by hardware or hardware driven by computer software depends on particular applications and design constraint conditions of the technical solutions. A person skilled in the art may use different methods to implement the described functions for each particular application with reference to embodiments, but it should not be considered that the implementation goes beyond the scope of the present disclosure.

In this embodiment, the foregoing one or more processors may be divided into function modules based on the foregoing method examples. For example, different processors may be obtained through division based on corresponding functions, or processors with two or more functions may be integrated into one processor module. The integrated module may be implemented in a form of hardware. It should be noted that, in this embodiment, division into the modules is an example, is merely logical function division, and may be other division during actual implementation.

When each function module is obtained through division based on each corresponding function, FIG. 9 is a possible schematic diagram of an apparatus 900 in the foregoing embodiment, and the apparatus mentioned above may be further extended. As shown in FIG. 9, the apparatus 900 may include an AI processing module 901 and an image signal processing module 902. The AI processing module 901 is configured to select a first image processing model from a plurality of image processing models, and perform first image signal processing on a first image signal by using the first image processing model, to obtain a second image signal, where the first image signal is obtained based on first image data output by an image sensor, and the scenario information represents feature classification of the first image signal. The image signal processing module 902 is configured to perform second image signal processing on the second image signal to obtain a first image processing result.

In a possible implementation, the scenario information includes at least one of the following: first ambient light luminance information and first motion status information of the electronic apparatus.

In a possible implementation, the image signal processing module 902 is configured to select, based on the scenario information, a first parameter from a plurality of groups of parameters used for running an image processing algorithm; obtain an updated image processing algorithm based on the first parameter; and perform the second image signal processing on the second image signal by using the updated image processing algorithm.

In a possible implementation, the AI processing module 901 is further configured to, when the first motion status information indicates that the electronic device moves at a speed lower than a preset threshold, process the first image signal based on a previous frame of image signal and an image processing result of the previous frame of image signal.

In a possible implementation, the first image signal processing includes at least one of the following processing procedures: noise cancellation, black level correction, shadow correction, white balance correction, demosaicing, chromatic aberration correction, or gamma correction.

In a possible implementation, the second image signal processing includes at least one of the following processing procedures: noise cancellation, black level correction, shadow correction, white balance correction, demosaicing, chromatic aberration correction, gamma correction, chromatic aberration correction, or RGB-to-YUV domain conversion.

In a possible implementation, the plurality of image processing models are obtained through training based on a plurality of training sample sets corresponding to a plurality of scenarios. Each of the plurality of training sample sets includes a preprocessed image signal generated by processing sample image data collected in a corresponding scenario and a reference image signal generated by processing the sample image data.

The image processing apparatus 900 provided in this embodiment is configured to execute the image processing method executed by the electronic apparatus 100, and may achieve a same effect as the foregoing implementation method or apparatus. Specifically, the modules corresponding to FIG. 9 may be implemented by software, hardware, or a combination thereof. For example, each module may be implemented in a form of software, corresponding to a corresponding processor corresponding to the module in FIG. 1, and configured to drive the corresponding processor to work. Alternatively, each module may include two parts of a corresponding processor and corresponding driver software, that is, implemented by combining software and hardware. Therefore, it may be considered that the image processing apparatus 900 logically includes the apparatuses shown in FIG. 1 and FIG. 3 to FIG. 6, and each module includes at least a driver software program of a corresponding function. Details are not described in this embodiment.

For example, the image processing apparatus 900 may include at least one processor and a memory. For details, refer to FIG. 1. The at least one processor may invoke all or a part of a computer program stored in the memory to control and manage an action of the electronic apparatus 100. For example, the at least one processor may be configured to support the electronic apparatus 100 in performing the steps performed by the foregoing modules. The memory may be configured to support the electronic apparatus 100 in executing program code, data, and the like. The at least one processor may implement or execute a plurality of example logical modules described with reference to content disclosed in this application, and may be a combination of one or more microprocessors that implement a computing function, for example, including but not limited to the AI processor 101 and the image signal processor 102 shown in FIG. 1. In addition, the at least one processor may further include another programmable logic device, a transistor logic device, a discrete hardware component, or the like. The memory in an embodiment may include but is not limited to the off-chip memory 108 or the memory 104 shown in FIG. 3.

An embodiment further provides a computer-readable storage medium. The computer-readable storage medium stores computer instructions. When the computer instructions run on a computer, the computer is enabled to perform the foregoing related method steps to implement the image processing method in the foregoing embodiments.

An embodiment further provides a computer program product. When the computer program product runs on a computer, the computer is enabled to perform the foregoing related steps, to implement the image processing method in the foregoing embodiments.

The computer-readable storage medium or the computer program product provided in embodiments are all configured to perform the foregoing corresponding methods. Therefore, for beneficial effects that can be achieved, refer to the beneficial effects in the foregoing corresponding methods. Details are not described herein again.

The foregoing descriptions about implementations allow a person skilled in the art to clearly understand that, for the purpose of convenient and brief description, division of the foregoing functional modules is used as an example for illustration. During actual application, the foregoing functions can be allocated to different modules and implemented based on a requirement, that is, an inner structure of an apparatus is divided into different functional modules to implement all or some of the functions described above.

In addition, functional units in embodiments may be integrated into one product, or each of the units may exist alone physically, or two or more units are integrated into one product. Corresponding to FIG. 9, when being implemented in the form of a software functional unit and sold or used as an independent product, the foregoing modules may be stored in a readable storage medium. Based on such an understanding, technical solutions in embodiments essentially, or a part that makes contributions to the conventional technology, or all or some of the technical solutions may be embodied in a form of a software product. The software product is stored in a storage medium, and includes several instructions for enabling a device (which may be a single-chip microcomputer, a chip, or the like) or a processor to perform all or some of the steps of the methods in embodiments. The foregoing readable storage medium includes: any medium that can store program code, such as a USB flash drive, a removable hard disk, a read-only memory (ROM), a random access memory (RAM), a magnetic disk, or an optical disc.

The foregoing descriptions are merely specific implementations, but are not intended to limit the protection scope. Any variation or replacement readily figured out by a person skilled in the art within the technical scope disclosed in this application shall fall within the protection scope. Therefore, the protection scope shall be as defined in the claims.

The invention claimed is:

1. An electronic apparatus, comprising: an artificial intelligence (AI) processor, configured to select an image processing model from a plurality of image processing models based on scenario information, and perform first image signal processing on a first image signal by using the selected image processing model, to obtain a second image signal, wherein the first image signal is obtained based on first image data output by an image sensor, and the scenario information represents feature classification of the first image signal and comprises first motion status information of the electronic apparatus, the AI processor being further configured to; generate the first motion status data based on acceleration data and three-axis component data representing motion of the image sensor and, when the first motion status information indicates that the electronic apparatus moves at a speed lower than a preset threshold, process, by using the selected image processing model, the first image signal based on a previous frame of an image signal and an image processing result of the previous frame of the image signal; and an image signal processor (ISP), configured to perform second image signal processing on the second image signal to obtain an image processing result.

2. The electronic apparatus according to claim 1, wherein the ISP is configured to:

select, based on the scenario information, a parameter from a plurality of groups of parameters of an image processing algorithm;

obtain an updated image processing algorithm based on the selected parameter; and perform the second image signal processing on the second image signal by using the updated image processing algorithm.

3. The electronic apparatus according to claim 1, wherein the electronic apparatus further comprises:

a controller, configured to generate the scenario information based on data collected by at least one sensor comprising at least one of an acceleration sensor, a gravity sensor, and/or the image sensor.

4. The electronic apparatus according to claim 1, wherein the first image signal processing comprises at least one of noise cancellation, black level correction, shadow correction, white balance correction, demosaicing, chromatic aberration correction, and/or gamma correction.

5. The electronic apparatus according to claim 1, wherein the second image signal processing comprises at least one of noise cancellation, black level correction, shadow correction, white balance correction, demosaicing, chromatic aberration correction, gamma correction, and/or RGB-to-YUV domain conversion.

6. The electronic apparatus according to claim 1, wherein the plurality of image processing models are obtained through training based on a plurality of training sample sets corresponding to a plurality of scenarios, wherein each of the plurality of training sample sets comprises a preprocessed image signal generated by processing sample image data collected in a corresponding scenario and a reference image signal generated by processing the sample image data.

7. An image processing method comprising: controlling an artificial intelligence (AI) processor to select an image processing model from a plurality of image processing models based on scenario information, and perform first image signal processing on a first image signal by using the selected image processing model, to obtain a second image signal, wherein the first image signal is obtained based on first image data output by an image sensor, and the scenario information represents feature classification of the first image signal and comprises first motion status information, the AI processor being further configured to; generate the first motion status data based on acceleration data and three-axis component data representing motion of the image sensor and, when the first motion status information indicates movement at a speed lower than a preset threshold, process, by using the selected image processing model, the first image signal based on a previous frame of an image signal and an image processing result of the previous frame of the image signal; and controlling an image signal processor (ISP) to perform second image signal processing on the second image signal to obtain an image processing result.

8. The image processing method according to claim 7, wherein the controlling the ISP to perform second image signal processing on the second image signal to obtain the image processing result comprises:

controlling the ISP to select, based on the scenario information, a first parameter from a plurality of groups of parameters of an image processing algorithm;

controlling the ISP to obtain an updated image processing algorithm based on the first parameter; and controlling the ISP to perform the second image signal processing on the second image signal by using the updated image processing algorithm.

9. A non-transitory computer-readable storage medium storing a computer program; that when executed by at least one processor, controls the at least one processor to perform operations comprising: controlling an artificial intelligence (AI) processor to select an image processing model from a plurality of image processing models based on scenario information, and perform first image signal processing on a first image signal by using the selected image processing model, to obtain a second image signal, wherein the first image signal is obtained based on first image data output by an image sensor, and the scenario information represents feature classification of the first image signal and comprises first motion status information, the AI processor being further controlled to; generate the first motion status data based on acceleration data and three-axis component data representing motion of the image sensor and, when the first motion status information indicates movement at a speed lower than a preset threshold, process, by using the selected image processing model, the first image signal based on a previous frame of an image signal and an image processing result of the previous frame of the image signal; and controlling an image signal processor (ISP) to perform second image signal processing on the second image signal to obtain an image processing result.

10. The computer-readable storage medium according to claim 9, wherein the controlling the ISP to perform second image signal processing on the second image signal to obtain the image processing result comprises:

controlling the ISP to select, based on the scenario information, a parameter from a plurality of groups of parameters of an image processing algorithm;

controlling the ISP to obtain an updated image processing algorithm based on the selected parameter; and controlling the ISP to perform the second image signal processing on the second image signal by using the updated image processing algorithm.

11. The image processing method according to claim 7, wherein the ISP is further controlled to:

select, based on the scenario information, a parameter from a plurality of groups of parameters of an image processing algorithm;

update an image processing algorithm based on the selected parameter; and perform the second image signal processing on the second image signal by using the updated image processing algorithm.

12. The image processing method according to claim 7, further comprising:

generating the scenario information based on data collected by an acceleration sensor, a gravity sensor, and/or the image sensor.

13. The image processing method according to claim 7, wherein performing the first and/or second image signal processing comprises at least one of noise cancellation, black level correction, shadow correction, white balance correction, demosaicing, chromatic aberration correction, and/or gamma correction.

14. The image processing method according to claim 7, further including obtaining the plurality of image processing models through training based on a plurality of training sample sets corresponding to a plurality of scenarios, wherein each of the plurality of training sample sets comprises a preprocessed image signal generated by processing sample image data collected in a corresponding scenario and a reference image signal generated by processing the sample image data.

15. The image processing method according to claim 7 further including the AI processor selectively replacing or supplementing intermediate image processing performed by the ISP.

16. The image processing method according to claim 7 further including selecting the image processing model based on detected motion speed and detected luminance.

17. The image processing method of claim 9 wherein the AI processor is further configured to compare the generated first motion status data with thresholds of a plurality of motion speed interval segments.

18. The image processing method of claim 7 wherein the AI processor is further configured to compare the generated first motion status data with thresholds of a plurality of motion speed interval segments.

19. The electronic apparatus of claim 1 wherein the AI processor is further configured to compare the generated first motion status data with thresholds of a plurality of motion speed interval segments.

* * * * *